United States Patent
Saito

(10) Patent No.: US 8,260,788 B2
(45) Date of Patent: Sep. 4, 2012

(54) DOCUMENT IMPORTANCE CALCULATION APPARATUS AND METHOD

(75) Inventor: Fumio Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 12/544,445

(22) Filed: Aug. 20, 2009

(65) Prior Publication Data
US 2009/0313246 A1 Dec. 17, 2009

Related U.S. Application Data

(63) Continuation of application No. PCT/JP2007/055352, filed on Mar. 16, 2007.

(51) Int. Cl.
*G06F 17/30* (2006.01)
(52) U.S. Cl. ...................................... 707/748
(58) Field of Classification Search .................. 707/748, 707/999.005, 999.007
See application file for complete search history.

(56) References Cited

U.S. PATENT DOCUMENTS

| | | | |
|---|---|---|---|
| 6,285,999 B1 * | 9/2001 | Page | 1/1 |
| 6,882,747 B2 * | 4/2005 | Thawonmas et al. | 382/190 |
| 7,058,628 B1 * | 6/2006 | Page | 1/1 |
| 7,269,587 B1 * | 9/2007 | Page | 1/1 |
| 7,346,621 B2 * | 3/2008 | Zhang et al. | 707/802 |
| 7,509,299 B2 * | 3/2009 | Liu et al. | 706/62 |
| 7,512,587 B2 * | 3/2009 | McSherry | 1/1 |
| 7,577,650 B2 * | 8/2009 | Wen et al. | 1/1 |
| 7,610,313 B2 * | 10/2009 | Kawai et al. | 1/1 |
| 7,624,104 B2 * | 11/2009 | Berkhin et al. | 1/1 |
| 7,634,476 B2 * | 12/2009 | Liu et al. | 1/1 |
| 7,676,520 B2 * | 3/2010 | Liu et al. | 707/748 |
| 7,877,384 B2 * | 1/2011 | Yu et al. | 707/723 |
| 7,930,303 B2 * | 4/2011 | Liu et al. | 707/748 |
| 8,019,763 B2 * | 9/2011 | Wang et al. | 707/738 |
| 2003/0204502 A1 | 10/2003 | Tomlin | |

(Continued)

FOREIGN PATENT DOCUMENTS

JP 2001-84256 3/2001

(Continued)

OTHER PUBLICATIONS

James P. Keener, "The Perron-Frobenius Theorem and the Ranking of Football Teams", SIAM Review, vol. 35, No. 1, Mar. 1993, pp. 80-93, accessed online at <https://umdrive.memphis.edu/ccrousse/public/MATH%207375/PERRON.pdf> on Sep. 9, 2011.*

(Continued)

*Primary Examiner* — Phuong Thao Cao
(74) *Attorney, Agent, or Firm* — Staas & Halsey LLP

(57) ABSTRACT

A computer readable storage medium stores a program that allows a computer to execute a process comprising: acquiring information related to N documents; determining elements of an N×N square matrix D based on the acquired information, in order that D, a positive real number e, and a column vector u having N elements satisfy e u=D u according to the Perron-Frobenius theorem, each of the elements of D being a positive real number; initializing a column vector v having N elements, each of the elements of v corresponding to each of the elements of u; calculating a column vector w=(D v)/|D v|; updating v in the memory to w; iterating the calculating and the updating, until the v satisfies a predetermined condition; and assigning each of elements of the v to the importance of the document.

20 Claims, 20 Drawing Sheets

U.S. PATENT DOCUMENTS

| | | | |
|---|---|---|---|
| 2005/0021577 A1* | 1/2005 | Prabhu et al. | 708/200 |
| 2005/0033742 A1* | 2/2005 | Kamvar et al. | 707/7 |
| 2005/0071741 A1 | 3/2005 | Acharya | |
| 2005/0216533 A1* | 9/2005 | Berkhin | 707/204 |
| 2005/0256832 A1* | 11/2005 | Zhang et al. | 707/1 |
| 2006/0026298 A1* | 2/2006 | Zeng et al. | 709/240 |
| 2006/0112392 A1* | 5/2006 | Zhang et al. | 718/102 |
| 2006/0259480 A1* | 11/2006 | Zhang et al. | 707/5 |
| 2007/0005588 A1* | 1/2007 | Zhang et al. | 707/5 |
| 2007/0143279 A1* | 6/2007 | Yao et al. | 707/5 |
| 2007/0198504 A1* | 8/2007 | Feng et al. | 707/5 |
| 2007/0214108 A1* | 9/2007 | Liu et al. | 707/2 |
| 2008/0016052 A1* | 1/2008 | Frieden | 707/5 |
| 2009/0125498 A1* | 5/2009 | Cao et al. | 707/5 |
| 2009/0228472 A1* | 9/2009 | Taylor et al. | 707/5 |
| 2010/0023513 A1* | 1/2010 | Berkhin et al. | 707/5 |
| 2011/0040717 A1* | 2/2011 | Rho et al. | 706/50 |

FOREIGN PATENT DOCUMENTS

| | | |
|---|---|---|
| JP | 2002-41524 | 2/2002 |

OTHER PUBLICATIONS

"The Perron-Frobenius Theorem", 642:550, Summer 2004, Supplement 6, 6 pages, accessed online at <http://www2.warwick.ac.uk/fac/sci/maths/people/staff/oleg_zaboronski/fm/pf_theory.pdf> on Sep. 9, 2011.*

Fowler et al., "Network Analysis and the Law: Measuring the Legal Importance of Supreme Court Precedents", 2006, 44 pages, accessed online at <http://polmeth.wustl.edu/media/Paper/networklaw.pdf> on Sep. 9, 2011.*

Thomas L. Saaty, "Rank According to Perron: A New Insight", Mathematics Magazine, vol. 60, No. 4, Oct. 1987, pp. 221-223, accessed online at <http://mathdl.maa.org/images/cms_upload/Thomas_L14346._Saaty.pdf> on May 2, 2012.*

Yan et al., "Calculating Webpage Importance with Site Structure Constraints", AIRS 2005, LNCS 3689, pp. 546-551 (6 pages), accessed online at <http://research.microsoft.com/en-us/um/people/taoqin/papers/qin-airs05b.pdf> on May 2, 2012.*

Taher H. Haveliwala, "Topic-Sensitive PageRank", WWW 2002, May 2002, 10 pages, accessed online at <http://www-cs-students.stanford.edu/~taherh/papers/topic-sensitive-pagerank.pdf> on May 2, 2012.*

Page, L et al., *The PageRank Citation Ranking: Bringing Order to the Web*, Jan. 29, 1998, http://www-db.stanford.edu/~backrub/pagerangsub.ps (17 pp., pp. 1-17).

Haveliwala, T. *Efficient Computation of PageRank*, Oct. 18, 1999, http://www-cs-students.stanford.edu/~taherh/papers/efficient-pr.pdf (15 pp., pp. 1-15)).

*Googe—PageRank*, Feb. 1, 2001, http://www.kusastro.kyoto-u.ac.jp/~baba/wais/pagerank.html (29 pp.).

International Search Report mailed Apr. 6, 2007, in corresponding PCT Application No. PCT/JP2007/055352 (11 pp.).

English Translation of the International Preliminary Report on Patentability issued Sep. 29, 2009 in corresponding International Patent Application PCT/JP2007/055352.

* cited by examiner

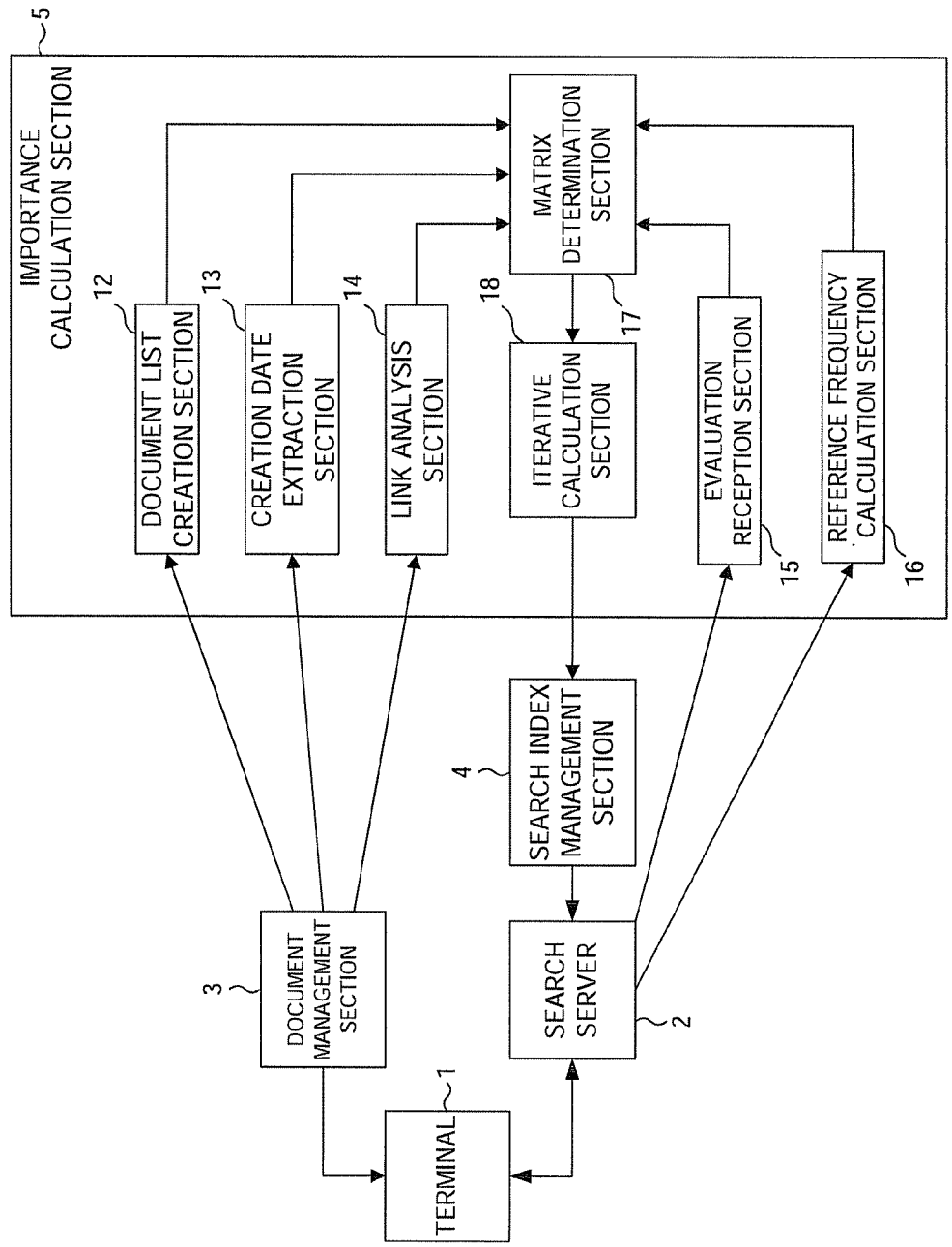

FIG. 2

| NUMBER | URL |
|---|---|
| 1 | http://server1.domain1.com/document1.html |
| 2 | http://server2.domain2.com/document2.html |
| 3 | http://server3.domain3.com/document3.html |
| ... | ... |

FIG. 3

| URL | CREATION DATE |
|---|---|
| http://server1.domain1.com/document1.html | 2005/9/21 |
| http://server2.domain2.com/documen2.html | 2005/9/22 |
| http://server3.domain3.com/document3.html | 2005/9/23 |
| ... | ... |

FIG. 4

| LINK SOURCE URL | LINK DESTINATION URL |
|---|---|
| http://server1.domain1.com/document1.html | http://server2.domain2.com/document2.html, http://server3.domain3.com/document3.html |
| http://server2.domain2.com/documen2.html | http://server3.domain3.com/document3.html |
| http://server3.domain3.com/document3.html | http://server1.domain1.com/document1.html |
| ... | ... |

FIG. 5

| URL | EVALUATION |
|---|---|
| http://server1.domain1.com/document1.html | 5 |
| http://server2.domain2.com/documen2.html | 2 |
| http://server3.domain3.com/document3.html | 3 |
| ... | ... |

FIG. 6

| URL | REFERENCE FREQUENCY |
|---|---|
| http://server1.domain1.com/document1.html | 141 |
| http://server2.domain2.com/documen2.html | 21 |
| http://server3.domain3.com/document3.html | 33 |
| ... | ... |

FIG. 8

| URL | IMPORTANCE |
|---|---|
| http://server1.domain1.com/document1.html | 1.000000 |
| http://server2.domain2.com/documen2.html | 0.980003 |
| http://server3.domain3.com/document3.html | 0.971333 |
| ... | ... |

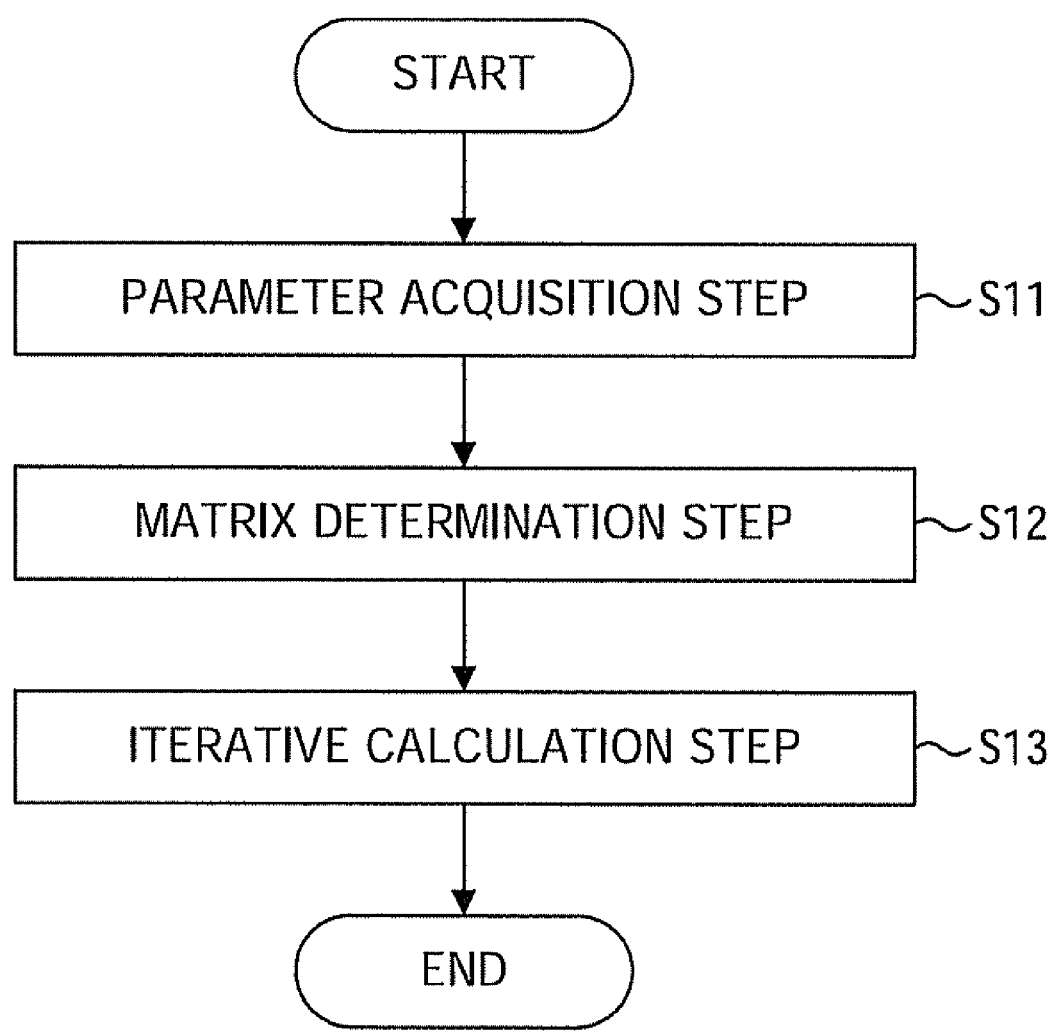

FIG. 11

|   | 1 | 2 | 3 | 4 | 5 | 6 |
|---|---|---|---|---|---|---|
| 1 | 0.5 | 0.2 | 0.7 | 0.2 | 0.3 | 0.01 |
| 2 | 0.2 | 0.1 | 0.3 | 0.1 | 0.1 | 0.3 |
| 3 | 0.1 | 0.01 | 0.01 | 0.5 | 0.01 | 0.2 |
| 4 | 0.1 | 0.01 | 0.01 | 0.8 | 0.01 | 0.3 |
| 5 | 0.3 | 0.02 | 0.3 | 0.2 | 0.02 | 0.3 |
| 6 | 0.2 | 0.3 | 0.02 | 0.3 | 0.01 | 0.2 |

FIG 12

| ITERATIVE COUNT k | 1 | 2 | 3 | 4 | 5 | 6 | 7 | 8 | 9 | 10 |
|---|---|---|---|---|---|---|---|---|---|---|
| D v_(k-1) | | 1.91000<br>1.10000<br>0.83000<br>1.23000<br>1.14000<br>1.03000 | 1.23262<br>0.67382<br>0.54592<br>0.79304<br>0.74440<br>0.68848 | 1.23479<br>0.67983<br>0.54933<br>0.79820<br>0.75212<br>0.68362 | 1.23908<br>0.68016<br>0.54998<br>0.79928<br>0.75203<br>0.68481 | 1.23711<br>0.67905<br>0.54906<br>0.79784<br>0.75109<br>0.68368 | 1.23711<br>0.67904<br>0.54899<br>0.79773<br>0.75105<br>0.68363 | 1.23704<br>0.67899<br>0.54893<br>0.79765<br>0.75100<br>0.68358 | 1.23702<br>0.67898<br>0.54892<br>0.79762<br>0.75098<br>0.68357 | 1.23701<br>0.67898<br>0.54891<br>0.79761<br>0.75098<br>0.68357 |
| e_(k-1) | | 1.91000<br>1.00000<br>0.57592<br>0.43455<br>0.64398<br>0.59686<br>0.53927 | 1.23262<br>1.00000<br>0.54666<br>0.44289<br>0.64338<br>0.60392<br>0.55855 | 1.23479<br>1.00000<br>0.55056<br>0.44488<br>0.64643<br>0.60911<br>0.55363 | 1.23908<br>1.00000<br>0.54892<br>0.44386<br>0.64505<br>0.60693<br>0.55268 | 1.23711<br>1.00000<br>0.54890<br>0.44383<br>0.64493<br>0.60713<br>0.55264 | 1.23711<br>1.00000<br>0.54889<br>0.44377<br>0.64484<br>0.60710<br>0.55260 | 1.23704<br>1.00000<br>0.54889<br>0.44375<br>0.64480<br>0.60709<br>0.55260 | 1.23702<br>1.00000<br>0.54889<br>0.44374<br>0.64479<br>0.60709<br>0.55260 | 1.23701<br>1.00000<br>0.54889<br>0.44374<br>0.64479<br>0.60709<br>0.55260 |
| v_k | | 0.00000<br>0.42408<br>0.56545<br>0.35602<br>0.40314<br>0.46073 | 0.00000<br>0.02926<br>-0.00834<br>0.00060<br>-0.00706<br>-0.01929 | 0.00000<br>-0.00390<br>-0.00199<br>-0.00305<br>-0.00519<br>0.00492 | 0.00000<br>0.00164<br>0.00101<br>0.00137<br>0.00218<br>0.00095 | 0.00000<br>0.00002<br>0.00004<br>0.00013<br>-0.00021<br>0.00004 | 0.00000<br>0.00002<br>0.00006<br>0.00009<br>0.00004<br>0.00004 | 0.00000<br>0.00000<br>0.00002<br>0.00003<br>0.00000<br>0.00000 | 0.00000<br>0.00000<br>0.00001<br>0.00001<br>0.00000<br>0.00000 | 0.00000<br>0.00000<br>0.00000<br>0.00000<br>0.00000<br>0.00000 |
| v_k - v_(k-1) | | 0.00000<br>-0.42408<br>-0.56545<br>-0.35602<br>-0.40314<br>-0.46073 | 0.00000<br>-0.02926<br>0.00834<br>-0.00060<br>0.00706<br>0.01929 | 0.00000<br>0.00390<br>0.00199<br>0.00305<br>0.00519<br>-0.00492 | 0.00000<br>-0.00164<br>-0.00101<br>-0.00137<br>-0.00218<br>-0.00095 | 0.00000<br>-0.00002<br>-0.00004<br>-0.00013<br>0.00021<br>-0.00004 | 0.00000<br>-0.00002<br>-0.00006<br>-0.00009<br>-0.00004<br>-0.00004 | 0.00000<br>0.00000<br>-0.00002<br>-0.00003<br>0.00000<br>0.00000 | 0.00000<br>0.00000<br>-0.00001<br>-0.00001<br>0.00000<br>0.00000 | 0.00000<br>0.00000<br>0.00000<br>0.00000<br>0.00000<br>0.00000 |
| v(k-1) - v_k | | | | | | | | | | |
| \| v_k - v_(k-1) \| | | 0.56545 | 0.02926 | 0.00519 | 0.00218 | 0.00021 | 0.00009 | 0.00003 | 0.00001 | 0.00000 |

FIG. 13

| DATA TALLYING DATE IS 2007/2/7 | | | | |
|---|---|---|---|---|
| DOCUMENT NAME | CREATION DATE | DIFFERENCE p IN DATE FROM 2007/2/7 | NUMBER q OF EFFECTIVE EVALUATIONS | REFERENCE FREQUENCY r |
| P_1 | 2007/2/6 | 1 | 1 | 30 |
| P_2 | 2007/1/30 | 8 | 2 | 85 |
| P_3 | 2007/1/15 | 23 | 3 | 513 |
| P_4 | 2006/12/30 | 39 | 10 | 324 |
| P_5 | 2006/11/20 | 79 | 1 | 70 |
| P_6 | 2006/11/10 | 89 | 5 | 110 |

FIG. 15

| TABLE OF LINK RELATIONSHIP AMONG DOCUMENTS | | | | | | | |
|---|---|---|---|---|---|---|---|
| | | From | | | | | |
| | DOCUMENT NAME | P_1 | P_2 | P_3 | P_4 | P_5 | P_6 |
| To | P_1 | | ○ | | | ○ | ○ |
| | P_2 | ○ | | | ○ | | |
| | P_3 | ○ | ○ | | | | ○ |
| | P_4 | ○ | | ○ | | | |
| | P_5 | | ○ | | ○ | | ○ |
| | P_6 | ○ | ○ | ○ | | ○ | |
| LINK NUMBER L_n | | 4 | 4 | 2 | 2 | 2 | 3 |

FIG. 16

| DOCUMENT NAME | WEIGHT OF CREATION DATE $x\_m$ | WEIGHT OF NUMBER OF EFFECTIVE EVALUATIONS $y\_m$ | WEIGHT OF REFERENCE FREQUENCY $z\_m$ |
|---|---|---|---|
| DETERMINATION METHOD | $\exp(-p/100) * 1.5$ | $\log(q+2) * 0.2$ | $\log(r+2) * 0.03$ |
| P_1 | 1.48507 | 0.09542 | 0.04515 |
| P_2 | 1.38467 | 0.12041 | 0.05819 |
| P_3 | 1.19180 | 0.13979 | 0.08135 |
| P_4 | 1.01559 | 0.21584 | 0.07540 |
| P_5 | 0.68077 | 0.09542 | 0.05572 |
| P_6 | 0.61598 | 0.16902 | 0.06148 |
| MAXIMUM WEIGHT VALUE | 1.48507 | 0.21584 | 0.08135 |

FIG. 17

|   | 1 | 2 | 3 | 4 | 5 | 6 |
|---|---|---|---|---|---|---|
| 1 | 1.65065 | 0.44183 | 1.65065 | 1.65065 | 0.88366 | 0.58911 |
| 2 | 0.42623 | 1.58827 | 1.58827 | 0.85247 | 1.58827 | 1.58827 |
| 3 | 0.38865 | 0.38865 | 1.43795 | 1.43795 | 1.43795 | 0.51821 |
| 4 | 0.36212 | 1.33182 | 0.72424 | 1.33182 | 1.33182 | 1.33182 |
| 5 | 0.85691 | 0.24339 | 0.85691 | 0.48679 | 0.85691 | 0.32453 |
| 6 | 0.24704 | 0.24704 | 0.49407 | 0.87148 | 0.49407 | 0.87148 |

FIG. 18

| ITERATIVE COUNT k | 1 | 2 | 3 | 4 | 5 | 6 | 7 | 8 | 9 | 10 | RANKING |
|---|---|---|---|---|---|---|---|---|---|---|---|
| D v_(k-1) |  | 6.86656 | 5.19612 | 5.37098 | 5.39928 | 5.39011 | 5.38909 | 5.38903 | 5.38903 | 5.38904 |  |
|  |  | 7.63179 | 5.28125 | 5.34248 | 5.35320 | 5.34239 | 5.34131 | 5.34127 | 5.34128 | 5.34128 |  |
|  |  | 5.60936 | 3.90574 | 3.98093 | 3.99467 | 3.98733 | 3.98661 | 3.98659 | 3.98660 | 3.98660 |  |
|  |  | 6.41364 | 4.50468 | 4.56141 | 4.56721 | 4.55687 | 4.55574 | 4.55567 | 4.55567 | 4.55567 |  |
|  |  | 3.62544 | 2.59752 | 2.69010 | 2.70966 | 2.70647 | 2.70621 | 2.70622 | 2.70623 | 2.70623 |  |
|  |  | 3.22518 | 2.16782 | 2.19954 | 2.20344 | 2.19829 | 2.19764 | 2.19759 | 2.19758 | 2.19758 |  |
| e_(k-1) |  | 7.63179 | 5.28125 | 5.37098 | 5.39928 | 5.39011 | 5.38909 | 5.38903 | 5.38903 | 5.38904 | 1 |
| v_k | 1 | 0.89973 | 0.98388 | 1.00000 | 1.00000 | 1.00000 | 1.00000 | 1.00000 | 1.00000 | 1.00000 | 2 |
|  | 1 | 1.00000 | 1.00000 | 0.99469 | 0.99147 | 0.99115 | 0.99114 | 0.99114 | 0.99114 | 0.99114 | 4 |
|  | 1 | 0.73500 | 0.73955 | 0.74119 | 0.73985 | 0.73975 | 0.73976 | 0.73976 | 0.73976 | 0.73976 | 3 |
|  | 1 | 0.84038 | 0.85296 | 0.84927 | 0.84589 | 0.84541 | 0.84536 | 0.84536 | 0.84536 | 0.84536 | 5 |
|  | 1 | 0.47504 | 0.49184 | 0.50086 | 0.50186 | 0.50212 | 0.50217 | 0.50217 | 0.50217 | 0.50217 | 6 |
|  | 1 | 0.42260 | 0.41047 | 0.40952 | 0.40810 | 0.40784 | 0.40779 | 0.40779 | 0.40779 | 0.40779 |  |
| v_k - v_(k-1) |  | -5.86656 | 1.67044 | -0.17486 | -0.02830 | 0.00917 | 0.00102 | 0.00006 | 0.00000 | 0.00000 |  |
|  |  | -6.63179 | 2.35054 | -0.06123 | -0.01073 | 0.01081 | 0.00108 | 0.00004 | -0.00001 | 0.00000 |  |
|  |  | -4.60936 | 1.70362 | -0.07519 | -0.01374 | 0.00734 | 0.00072 | 0.00002 | -0.00001 | 0.00000 |  |
|  |  | -5.41364 | 1.90895 | -0.05673 | -0.00580 | 0.01034 | 0.00114 | 0.00007 | 0.00000 | 0.00000 |  |
|  |  | -2.62544 | 1.02793 | -0.09258 | -0.01956 | 0.00319 | 0.00026 | -0.00001 | -0.00001 | 0.00000 |  |
|  |  | -2.22518 | 1.05736 | -0.03173 | -0.00390 | 0.00515 | 0.00064 | 0.00006 | 0.00000 | 0.00000 |  |
| v_(k-1) - v_k |  | 5.86656 | -1.67044 | 0.17486 | 0.02830 | -0.00917 | -0.00102 | -0.00006 | 0.00000 | 0.00000 |  |
|  |  | 6.63179 | -2.35054 | 0.06123 | 0.01073 | -0.01081 | -0.00108 | -0.00004 | 0.00001 | 0.00000 |  |
|  |  | 4.60936 | -1.70362 | 0.07519 | 0.01374 | -0.00734 | -0.00072 | -0.00002 | 0.00001 | 0.00000 |  |
|  |  | 5.41364 | -1.90895 | 0.05673 | 0.00580 | -0.01034 | -0.00114 | -0.00007 | 0.00000 | 0.00000 |  |
|  |  | 2.62544 | -1.02793 | 0.09258 | 0.01956 | -0.00319 | -0.00026 | 0.00001 | 0.00001 | 0.00000 |  |
|  |  | 2.22518 | -1.05736 | 0.03173 | 0.00390 | -0.00515 | -0.00064 | -0.00006 | 0.00000 | 0.00000 |  |
| \| v_k - v_(k-1) \| |  | 6.63179 | 2.35054 | 0.17486 | 0.02830 | 0.01081 | 0.00114 | 0.00007 | 0.00001 | 0.00000 |  |

FIG. 19

| DOCUMENT NAME | WEIGHT OF CREATION DATE x_m | WEIGHT OF NUMBER OF EFFECTIVE EVALUATIONS y_m | WEIGHT OF REFERENCE FREQUENCY z_m |
|---|---|---|---|
| DETERMINATION METHOD | exp( - p / 100 ) * 0.2 | log ( q + 2 ) * 1.2 | log ( r + 2 ) * 0.03 |
| P_1 | 0.19801 | 0.57255 | 0.04515 |
| P_2 | 0.18462 | 0.72247 | 0.05819 |
| P_3 | 0.15891 | 0.83876 | 0.08135 |
| P_4 | 0.13541 | 1.29502 | 0.07540 |
| P_5 | 0.09077 | 0.57255 | 0.05572 |
| P_6 | 0.08213 | 1.01412 | 0.06148 |
| MAXIMUM WEIGHT VALUE | 0.19801 | 1.29502 | 0.08135 |

FIG. 20

|   | 1 | 2 | 3 | 4 | 5 | 6 |
|---|---|---|---|---|---|---|
| 1 | 0.84071 | 0.23934 | 0.84071 | 0.84071 | 0.47869 | 0.31913 |
| 2 | 0.27674 | 0.99028 | 0.99028 | 0.55347 | 0.99028 | 0.99028 |
| 3 | 0.30517 | 0.30517 | 1.10402 | 1.10402 | 1.10402 | 0.40690 |
| 4 | 0.41187 | 1.53083 | 0.82375 | 1.53083 | 1.53083 | 1.53083 |
| 5 | 0.74403 | 0.21518 | 0.74403 | 0.43035 | 0.74403 | 0.28690 |
| 6 | 0.32485 | 0.32485 | 0.64970 | 1.18273 | 0.64970 | 1.18273 |

FIG. 21

| ITERATIVE COUNT k | 2 | 3 | 4 | 5 | 6 | 7 | 8 | 9 | 10 | RANKING |
|---|---|---|---|---|---|---|---|---|---|---|
| D v_(k-1) | 3.55929 | 2.29072 | 2.26841 | 2.27516 | 2.27473 | 2.27436 | 2.27431 | 2.27430 | 2.27430 | 5 |
|  | 4.79133 | 2.92113 | 2.86695 | 2.87714 | 2.87723 | 2.87679 | 2.87672 | 2.87672 | 2.87672 | 3 |
|  | 4.32932 | 2.81315 | 2.76711 | 2.77274 | 2.77228 | 2.77186 | 2.77179 | 2.77178 | 2.77178 | 4 |
|  | 7.35892 | 4.76718 | 4.68222 | 4.69728 | 4.69791 | 4.69737 | 4.69727 | 4.69726 | 4.69726 | 1 |
|  | 3.16453 | 1.85620 | 1.82340 | 1.82944 | 1.82907 | 1.82871 | 1.82865 | 1.82864 | 1.82864 | 6 |
|  | 4.31454 | 2.90639 | 2.89531 | 2.90734 | 2.90762 | 2.90732 | 2.90728 | 2.90728 | 2.90728 | 2 |
| e_(k-1) | 7.35892 | 4.76718 | 4.68222 | 4.69728 | 4.69791 | 4.69737 | 4.69727 | 4.69726 | 4.69726 | |
| v_k | 0.48367 | 0.48052 | 0.48447 | 0.48436 | 0.48420 | 0.48418 | 0.48418 | 0.48418 | 0.48418 | |
|  | 0.65109 | 0.61276 | 0.61231 | 0.61251 | 0.61245 | 0.61243 | 0.61242 | 0.61242 | 0.61242 | |
|  | 0.58831 | 0.59011 | 0.59098 | 0.59029 | 0.59011 | 0.59009 | 0.59009 | 0.59008 | 0.59008 | |
|  | 1.00000 | 1.00000 | 1.00000 | 1.00000 | 1.00000 | 1.00000 | 1.00000 | 1.00000 | 1.00000 | |
|  | 0.43003 | 0.38937 | 0.38943 | 0.38947 | 0.38934 | 0.38930 | 0.38930 | 0.38930 | 0.38930 | |
|  | 0.58630 | 0.60967 | 0.61836 | 0.61894 | 0.61892 | 0.61893 | 0.61893 | 0.61893 | 0.61893 | |
| v_k - v_(k-1) | -2.55929 | 1.26857 | 0.02232 | -0.00675 | -0.00043 | 0.00037 | 0.00005 | 0.00000 | 0.00000 | |
|  | -3.79133 | 1.87021 | 0.05417 | -0.01018 | -0.00009 | 0.00043 | 0.00007 | 0.00001 | 0.00000 | |
|  | -3.32932 | 1.51616 | 0.04605 | -0.00564 | 0.00047 | 0.00042 | 0.00007 | 0.00001 | 0.00000 | |
|  | -6.35892 | 2.59174 | 0.08496 | -0.01506 | -0.00063 | 0.00054 | 0.00010 | 0.00001 | 0.00000 | |
|  | -2.16453 | 1.30833 | 0.03280 | -0.00603 | 0.00037 | 0.00037 | 0.00006 | 0.00001 | 0.00000 | |
|  | -3.31454 | 1.40815 | 0.01108 | -0.01203 | -0.00028 | 0.00030 | 0.00004 | 0.00000 | 0.00000 | |
| v_(k-1) - v_k | 2.55929 | -1.26857 | -0.02232 | 0.00675 | -0.00043 | -0.00037 | -0.00005 | 0.00000 | 0.00000 | |
|  | 3.79133 | -1.87021 | -0.05417 | 0.01018 | 0.00009 | -0.00043 | -0.00007 | -0.00001 | 0.00000 | |
|  | 3.32932 | -1.51616 | -0.04605 | 0.00564 | -0.00047 | -0.00042 | -0.00007 | -0.00001 | 0.00000 | |
|  | 6.35892 | -2.59174 | -0.08496 | 0.01506 | 0.00063 | -0.00054 | -0.00010 | -0.00001 | 0.00000 | |
|  | 2.16453 | -1.30833 | -0.03280 | 0.00603 | -0.00037 | -0.00037 | -0.00006 | -0.00001 | 0.00000 | |
|  | 3.31454 | -1.40815 | -0.01108 | 0.01203 | 0.00028 | -0.00030 | -0.00004 | 0.00000 | 0.00000 | |
| \| v_k - v_(k-1) \| | 6.35892 | 2.59174 | 0.08496 | 0.01506 | 0.00063 | 0.00054 | 0.00010 | 0.00001 | 0.00000 | |

FIG. 22

| DOCUMENT NAME | WEIGHT OF CREATION DATE x_m | WEIGHT OF NUMBER OF EFFECTIVE EVALUATIONS y_m | WEIGHT OF REFERENCE FREQUENCY z_m |
|---|---|---|---|
| DETERMINATION METHOD | exp( - p / 100 ) * 0.2 | log ( q + 2 ) * 0.2 | log ( r + 2 ) * 0.2 |
| P_1 | 0.19801 | 0.09542 | 1.80618 |
| P_2 | 0.18462 | 0.12041 | 2.32742 |
| P_3 | 0.15891 | 0.13979 | 3.25417 |
| P_4 | 0.13541 | 0.21584 | 3.01586 |
| P_5 | 0.09077 | 0.09542 | 2.22880 |
| P_6 | 0.08213 | 0.16902 | 2.45906 |
| MAXIMUM WEIGHT VALUE | 0.19801 | 0.21584 | 3.25417 |

FIG. 23

|   | 1 | 2 | 3 | 4 | 5 | 6 |
|---|---|---|---|---|---|---|
| 1 | 2.12461 | 0.56032 | 2.12461 | 2.12461 | 1.12064 | 0.74709 |
| 2 | 0.69353 | 2.65746 | 2.65746 | 1.38706 | 2.65746 | 2.65746 |
| 3 | 0.92363 | 0.92363 | 3.57787 | 3.57787 | 3.57787 | 1.23151 |
| 4 | 0.87719 | 3.39211 | 1.75439 | 3.39211 | 3.39211 | 3.39211 |
| 5 | 2.43999 | 0.63916 | 2.43999 | 1.27833 | 2.43999 | 0.85222 |
| 6 | 0.71297 | 0.71297 | 1.42594 | 2.73521 | 1.42594 | 2.73521 |

F I G. 24

| ITERATIVE COUNT k | 2 | 3 | 4 | 5 | 6 | 7 | 8 | 9 | 10 | 11 | RANKING |
|---|---|---|---|---|---|---|---|---|---|---|---|
| D v_(k-1) | 8.80190 | 6.67759 | 6.72862 | 6.76726 | 6.76921 | 6.76879 | 6.76878 | 6.76880 | 6.76880 | 6.76880 | 6 |
| | 12.71043 | 9.36892 | 9.36962 | 9.42637 | 9.43057 | 9.42999 | 9.42995 | 9.42997 | 9.42997 | 9.42997 | 3 |
| | 13.81239 | 10.82435 | 10.84629 | 10.90112 | 10.90528 | 10.90483 | 10.90482 | 10.90485 | 10.90485 | 10.90485 | 2 |
| | 16.20002 | 12.17981 | 12.12155 | 12.18397 | 12.18947 | 12.18883 | 12.18876 | 12.18878 | 12.18879 | 12.18879 | 1 |
| | 10.08969 | 7.21839 | 7.24223 | 7.29211 | 7.29554 | 7.29507 | 7.29506 | 7.29508 | 7.29508 | 7.29508 | 5 |
| | 9.74824 | 7.43176 | 7.45581 | 7.49235 | 7.49402 | 7.49350 | 7.49346 | 7.49348 | 7.49348 | 7.49348 | 4 |
| e_(k-1) | 16.20002 | 12.17981 | 12.12155 | 12.18397 | 12.18947 | 12.18883 | 12.18876 | 12.18878 | 12.18879 | 12.18879 | |
| v_k | 1 | 0.54825 | 0.55510 | 0.55542 | 0.55533 | 0.55533 | 0.55533 | 0.55533 | 0.55533 | 0.55533 | |
| | 1 | 0.76922 | 0.77297 | 0.77367 | 0.77367 | 0.77366 | 0.77366 | 0.77366 | 0.77366 | 0.77366 | |
| | 1 | 0.88871 | 0.89479 | 0.89471 | 0.89465 | 0.89466 | 0.89466 | 0.89466 | 0.89466 | 0.89466 | |
| | 1 | 1.00000 | 1.00000 | 1.00000 | 1.00000 | 1.00000 | 1.00000 | 1.00000 | 1.00000 | 1.00000 | |
| | 1 | 0.59265 | 0.59747 | 0.59850 | 0.59851 | 0.59850 | 0.59851 | 0.59851 | 0.59851 | 0.59851 | |
| | 1 | 0.61017 | 0.61509 | 0.61494 | 0.61479 | 0.61478 | 0.61478 | 0.61478 | 0.61478 | 0.61478 | |
| v_k - v_(k-1) | | 2.12431 | -0.05103 | -0.03864 | -0.00195 | 0.00042 | 0.00001 | -0.00002 | 0.00000 | 0.00000 | |
| | | 3.34151 | -0.00071 | -0.05675 | -0.00420 | 0.00058 | 0.00004 | -0.00002 | 0.00000 | 0.00000 | |
| | | 2.98804 | -0.02194 | -0.05483 | -0.00415 | 0.00044 | 0.00001 | -0.00003 | -0.000001 | 0.00000 | |
| | | 4.02021 | 0.05825 | -0.06242 | -0.00549 | 0.00064 | 0.00007 | -0.00002 | -0.000001 | 0.00000 | |
| | | 2.87130 | -0.02384 | -0.04988 | -0.00343 | 0.00047 | 0.00002 | -0.00001 | 0.00000 | 0.00000 | |
| | | 2.31649 | -0.02406 | -0.03654 | -0.00167 | 0.00052 | 0.00003 | -0.00001 | 0.00000 | 0.00000 | |
| v_(k-1) - v_k | | -2.12431 | 0.05103 | 0.03864 | 0.00195 | -0.00042 | -0.00001 | 0.00002 | 0.00000 | 0.00000 | |
| | | -3.34151 | 0.00071 | 0.05675 | 0.00420 | -0.00058 | -0.00004 | 0.00002 | 0.00000 | 0.00000 | |
| | | -2.98804 | 0.02194 | 0.05483 | 0.00415 | -0.00044 | -0.00001 | 0.00003 | 0.000001 | 0.00000 | |
| | | -4.02021 | -0.05825 | 0.06242 | 0.00549 | -0.00064 | -0.00007 | 0.00002 | 0.000001 | 0.00000 | |
| | | -2.87130 | 0.02384 | 0.04988 | 0.00343 | -0.00047 | -0.00002 | 0.00001 | 0.00000 | 0.00000 | |
| | | -2.31649 | 0.02406 | 0.03654 | 0.00167 | -0.00052 | -0.00003 | 0.00001 | 0.00000 | 0.00000 | |
| \|v_k - v_(k-1)\| | 15.20002 | 4.02021 | 0.05825 | 0.06242 | 0.00549 | 0.00064 | 0.00007 | 0.00003 | 0.00001 | 0.00000 | |

FIG. 25

|   | 1 | 2 | 3 | 4 | 5 | 6 |
|---|---|---|---|---|---|---|
| 1 | 0.38722 | 0.97942 | 0.28914 | 0.81808 | 0.24285 | 0.55311 |
| 2 | 0.54048 | 0.16593 | 0.98035 | 0.35718 | 0.50029 | 0.52837 |
| 3 | 0.21051 | 0.17164 | 0.88683 | 0.77298 | 0.40282 | 0.54871 |
| 4 | 0.02211 | 0.15709 | 0.98159 | 0.69746 | 0.85243 | 0.29430 |
| 5 | 0.38364 | 0.31414 | 0.40070 | 0.29392 | 0.44223 | 0.44870 |
| 6 | 0.10749 | 0.38091 | 0.74533 | 0.84700 | 0.00916 | 0.91599 |

FIG. 26

|   | 1 | 2 | 3 | 4 | 5 | 6 |
|---|---|---|---|---|---|---|
| 1 | 0.41222 | 1.21692 | 0.31414 | 0.84308 | 0.69285 | 0.86145 |
| 2 | 0.77798 | 0.19093 | 1.00535 | 0.80718 | 0.52529 | 0.55337 |
| 3 | 0.44801 | 0.40914 | 0.91183 | 0.79798 | 0.42782 | 0.85705 |
| 4 | 0.25961 | 0.18209 | 1.43159 | 0.72246 | 0.87743 | 0.31930 |
| 5 | 0.40864 | 0.55164 | 0.42570 | 0.74392 | 0.46723 | 0.75703 |
| 6 | 0.34499 | 0.61841 | 1.19533 | 0.87200 | 0.45916 | 0.94099 |

FIG. 28

|   | 1 | 2 | 3 | 4 | 5 | 6 |
|---|---|---|---|---|---|---|
| 1 | 0.02500 | 0.23750 | 0.02500 | 0.02500 | 0.45000 | 0.30833 |
| 2 | 0.23750 | 0.02500 | 0.02500 | 0.45000 | 0.02500 | 0.02500 |
| 3 | 0.23750 | 0.23750 | 0.02500 | 0.02500 | 0.02500 | 0.30833 |
| 4 | 0.23750 | 0.02500 | 0.45000 | 0.02500 | 0.02500 | 0.02500 |
| 5 | 0.02500 | 0.23750 | 0.02500 | 0.45000 | 0.02500 | 0.30833 |
| 6 | 0.23750 | 0.23750 | 0.45000 | 0.02500 | 0.45000 | 0.02500 |

FIG.27

| ITERATIVE COUNT k | 1 | 2 | 3 | 4 | 5 | 6 | 7 | 8 | RANKING |
|---|---|---|---|---|---|---|---|---|---|
| D v_(k-1) | 1 | 4.34065 | 3.84460 | 3.81935 | 3.81700 | 3.81680 | 3.81677 | 3.81677 | 2 |
|  | 1 | 3.86010 | 3.44433 | 3.41988 | 3.41819 | 3.41799 | 3.41797 | 3.41797 | 4 |
|  | 1 | 3.85182 | 3.45189 | 3.42942 | 3.42792 | 3.42776 | 3.42774 | 3.42774 | 3 |
|  | 1 | 3.79247 | 3.25932 | 3.24343 | 3.24135 | 3.24125 | 3.24122 | 3.24122 | 5 |
|  | 1 | 3.35416 | 2.99842 | 2.97589 | 2.97450 | 2.97434 | 2.97432 | 2.97432 | 6 |
|  | 1 | 4.43088 | 3.95076 | 3.92811 | 3.92627 | 3.92612 | 3.92609 | 3.92609 | 1 |
| e_(k-1) |  | 4.43088 | 3.95076 | 3.92811 | 3.92627 | 3.92612 | 3.92609 | 3.92609 |  |
| v_k | 1 | 0.97963 | 0.97313 | 0.97231 | 0.97217 | 0.97216 | 0.97216 | 0.97216 |  |
|  | 1 | 0.87118 | 0.87181 | 0.87062 | 0.87060 | 0.87058 | 0.87058 | 0.87058 |  |
|  | 1 | 0.86931 | 0.87373 | 0.87304 | 0.87307 | 0.87307 | 0.87307 | 0.87307 |  |
|  | 1 | 0.85592 | 0.82499 | 0.82570 | 0.82555 | 0.82556 | 0.82556 | 0.82556 |  |
|  | 1 | 0.75700 | 0.75895 | 0.75759 | 0.75759 | 0.75758 | 0.75758 | 0.75758 |  |
|  | 1 | 1.00000 | 1.00000 | 1.00000 | 1.00000 | 1.00000 | 1.00000 | 1.00000 |  |
| v_k − v_(k-1) |  | -3.34065 | 0.49605 | 0.02525 | 0.00235 | 0.00020 | 0.00003 | 0.00000 |  |
|  |  | -2.86010 | 0.41577 | 0.02444 | 0.00169 | 0.00020 | 0.00002 | 0.00000 |  |
|  |  | -2.85182 | 0.39993 | 0.02248 | 0.00149 | 0.00016 | 0.00002 | 0.00000 |  |
|  |  | -2.79247 | 0.53315 | 0.01589 | 0.00209 | 0.00010 | 0.00002 | 0.00000 |  |
|  |  | -2.35416 | 0.35574 | 0.02253 | 0.00139 | 0.00016 | 0.00002 | 0.00000 |  |
|  |  | -3.43088 | 0.48012 | 0.02265 | 0.00184 | 0.00015 | 0.00002 | 0.00000 |  |
| v_(k-1) − v_k |  | 3.34065 | -0.49605 | -0.02525 | -0.00235 | -0.00020 | -0.00003 | 0.00000 |  |
|  |  | 2.86010 | -0.41577 | -0.02444 | -0.00169 | -0.00020 | -0.00002 | 0.00000 |  |
|  |  | 2.85182 | -0.39993 | -0.02248 | -0.00149 | -0.00016 | -0.00002 | 0.00000 |  |
|  |  | 2.79247 | -0.53315 | -0.01589 | -0.00209 | -0.00010 | -0.00002 | 0.00000 |  |
|  |  | 2.35416 | -0.35574 | -0.02253 | -0.00139 | -0.00016 | -0.00002 | 0.00000 |  |
|  |  | 3.43088 | -0.48012 | -0.02265 | -0.00184 | -0.00015 | -0.00002 | 0.00000 |  |
| \|v_k − v_(k-1)\| |  | 3.43088 | 0.53315 | 0.02525 | 0.00235 | 0.00020 | 0.00003 | 0.00000 |  |

FIG. 29

| ITERATIVE COUNT k | | 2 | 3 | 4 | 5 | 6 | 7 | 8 | 9 | 10 | 11 | 12 | 13 | 14 | RANKING |
|---|---|---|---|---|---|---|---|---|---|---|---|---|---|---|---|
| D v_(k-1) | | 0.62083 | 0.51360 | 0.47245 | 0.49227 | 0.48220 | 0.48529 | 0.48470 | 0.48483 | 0.48475 | 0.48480 | 0.48478 | 0.48478 | 0.48478 | 6 |
| | | 0.76250 | 0.53053 | 0.51100 | 0.53338 | 0.52036 | 0.52388 | 0.52350 | 0.52354 | 0.52345 | 0.52351 | 0.52349 | 0.52349 | 0.52349 | 5 |
| | | 0.83333 | 0.63974 | 0.60499 | 0.62418 | 0.61284 | 0.61652 | 0.61586 | 0.61596 | 0.61588 | 0.61594 | 0.61592 | 0.61592 | 0.61592 | 3 |
| | | 0.76250 | 0.55931 | 0.55251 | 0.56269 | 0.55300 | 0.55645 | 0.55597 | 0.55594 | 0.55592 | 0.55596 | 0.55594 | 0.55594 | 0.55594 | 4 |
| | | 1.04583 | 0.82346 | 0.76112 | 0.80079 | 0.78084 | 0.78628 | 0.78548 | 0.78566 | 0.78548 | 0.78556 | 0.78556 | 0.78556 | 0.78556 | 1 |
| | | 0.97500 | 0.71424 | 0.68941 | 0.70536 | 0.69454 | 0.69806 | 0.69756 | 0.69757 | 0.69752 | 0.69757 | 0.69755 | 0.69755 | 0.69755 | 2 |
| e_(k-1) | | 1.04583 | 0.82346 | 0.76112 | 0.80079 | 0.78084 | 0.78628 | 0.78548 | 0.78566 | 0.78548 | 0.78559 | 0.78555 | 0.78556 | 0.78556 | |
| | 1 | 0.59363 | 0.62371 | 0.62073 | 0.61474 | 0.61755 | 0.61720 | 0.61708 | 0.61711 | 0.61713 | 0.61712 | 0.61712 | 0.61712 | 0.61712 | |
| | 1 | 0.72908 | 0.64427 | 0.67137 | 0.66608 | 0.66641 | 0.66627 | 0.66648 | 0.66637 | 0.66640 | 0.66640 | 0.66640 | 0.66640 | 0.66640 | |
| | 1 | 0.79681 | 0.77690 | 0.79486 | 0.77946 | 0.78484 | 0.78410 | 0.78406 | 0.78401 | 0.78408 | 0.78405 | 0.78406 | 0.78406 | 0.78406 | |
| | 1 | 0.72908 | 0.67923 | 0.72591 | 0.70267 | 0.70821 | 0.70770 | 0.70782 | 0.70762 | 0.70774 | 0.70770 | 0.70770 | 0.70770 | 0.70770 | |
| v_k | 1 | 1.00000 | 1.00000 | 1.00000 | 1.00000 | 1.00000 | 1.00000 | 1.00000 | 1.00000 | 1.00000 | 1.00000 | 1.00000 | 1.00000 | 1.00000 | |
| | 1 | 0.93227 | 0.86737 | 0.90579 | 0.88083 | 0.88947 | 0.88780 | 0.88807 | 0.88788 | 0.88801 | 0.88796 | 0.88797 | 0.88797 | 0.88797 | |
| v_k - v_(k-1) | | 0.37917 | 0.10724 | 0.04115 | -0.01982 | 0.01007 | -0.00309 | -0.00059 | -0.00013 | 0.00009 | -0.00005 | 0.00002 | -0.00001 | 0.00000 | |
| | | 0.23750 | 0.23197 | 0.01953 | -0.02239 | 0.01302 | -0.00352 | -0.00038 | -0.00004 | 0.00009 | -0.00007 | 0.00002 | -0.00001 | 0.00000 | |
| | | 0.16667 | 0.19359 | 0.03475 | -0.01919 | 0.01134 | -0.00369 | -0.00066 | -0.00011 | 0.00008 | -0.00006 | 0.00002 | -0.00001 | 0.00000 | |
| | | 0.23750 | 0.20319 | 0.00681 | -0.01018 | 0.00969 | -0.00345 | -0.00047 | 0.00003 | 0.00003 | -0.00004 | 0.00002 | 0.00000 | 0.00000 | |
| | | -0.04583 | 0.22238 | 0.06234 | -0.03966 | 0.01995 | -0.00544 | -0.00081 | -0.00018 | 0.00018 | -0.00011 | 0.00004 | -0.00001 | 0.00000 | |
| | | -0.02500 | 0.26076 | 0.02483 | -0.01594 | 0.01082 | -0.00352 | -0.00050 | -0.00001 | 0.00005 | -0.00005 | 0.00002 | -0.00001 | 0.00000 | |
| v_(k-1) - v_k | | -0.37917 | -0.10724 | -0.04115 | 0.01982 | -0.01007 | 0.00309 | -0.00059 | 0.00013 | -0.00009 | 0.00005 | -0.00002 | 0.00001 | 0.00000 | |
| | | -0.23750 | -0.23197 | -0.01953 | 0.02239 | -0.01302 | 0.00352 | -0.00038 | 0.00004 | -0.00009 | 0.00007 | -0.00002 | 0.00001 | 0.00000 | |
| | | -0.16667 | -0.19359 | -0.03475 | 0.01919 | -0.01134 | 0.00369 | -0.00066 | 0.00011 | -0.00008 | 0.00006 | -0.00002 | 0.00001 | 0.00000 | |
| | | -0.23750 | -0.20319 | -0.00681 | 0.01018 | -0.00969 | 0.00345 | -0.00047 | -0.00003 | -0.00003 | 0.00004 | -0.00002 | 0.00000 | 0.00000 | |
| | | 0.04583 | -0.22238 | -0.06234 | 0.03966 | -0.01995 | 0.00544 | -0.00081 | 0.00018 | -0.00018 | 0.00011 | -0.00004 | 0.00001 | 0.00000 | |
| | | 0.02500 | -0.26076 | -0.02483 | 0.01594 | -0.01082 | 0.00352 | -0.00050 | 0.00001 | -0.00005 | 0.00005 | -0.00002 | 0.00001 | 0.00000 | |
| \| v_k - v_(k-1) \| | | 0.37917 | 0.26076 | 0.06234 | 0.03966 | 0.01995 | 0.00544 | 0.00081 | 0.00018 | 0.00018 | 0.00011 | 0.00004 | 0.00001 | 0.00000 | | ic text: US 8,260,788 B2

DOCUMENT IMPORTANCE CALCULATION APPARATUS AND METHOD

CROSS-REFERENCE TO RELATED APPLICATIONS

This application is a continuation application, filed under 35 U.S.C. §111(a), of PCT Application No. PCT/JP2007/055352, filed Mar. 16, 2007, the disclosure of which is herein incorporated in its entirety by reference.

FIELD

The embodiment discussed herein is related to a document importance calculation apparatus, and a document importance calculation method that calculates importance for each of a plurality of documents.

BACKGROUND

For a search system that searches for a document containing links, such a Web page, a technique for determining the display order of search results has been used (refer to, e.g., Patent Document 1, Patent Document 2, Non-Patent Document 1, and Non-Patent Document 2). A technique disclosed in Patent Document 1 determines the importance of each document based only on link relationship among documents to be searched for and displays search results in the descending order in terms of the importance.

Patent Document 1: U.S. Pat. No. 6,285,999
Patent Document 2: U.S. Patent Application Publication No. 2005/0071741
Non-Patent Document 1: "The PageRank Citation Ranking: Bringing Order to the Web": Lawrence Page, Sergey Brin, Rajeev Motwani, Terry Winograd (Jan. 29, 1998)
Non-Patent Document 2: "Efficient Computation of PageRank": Taher H. Haveliwala (Oct. 18, 1999)

However, the technique disclosed in Patent Document 1 can calculate the importance of the document to be searched for based only on the link relationship among the documents to be searched due to a large limitation imposed by the importance calculation.

Further, there are available some methods for calculating the importance considering influence of a plurality of types of parameters. A technique disclosed in Patent Document 2 calculates the importance based on the link relationship and then corrects the importance based on another parameter. However, the information calculated based on the link relationship is lost by the correction made based on the another parameter. Further, the technique disclosed in Patent Document 2 does not describe a concrete method for taking the influence of a plurality of types of parameters into consideration.

Although there can be considered a method in which weighting is given to a plurality of obtained importance degrees that have been calculated for each parameter, this method entails a problem that, since the importance calculation involving time-consuming iterative calculations is performed for each parameter, calculation amount becomes enormous.

SUMMARY

According to an aspect of the invention, A computer readable storage medium stores a document importance calculation program that allows a computer to execute a process comprising: acquiring information related to N documents; determining elements of an N×N square matrix D based on the acquired information, in order that D, a positive real number e, and a column vector u having N elements satisfy e u=D u according to the Perron-Frobenius theorem, each of the elements of D being a positive real number, each of the elements of u corresponding to importance of each of the N documents; initializing a column vector v having N elements so as to store v in a memory, each of the elements of v corresponding to each of the elements of u; calculating a column vector w=(D v)/|D v|; updating v in the memory to w; iterating the calculating of w and the updating of v, until the updated v satisfies a predetermined condition, so as to obtain the updated v being an approximation of u; and assigning each of elements of the updated v to the importance of the corresponding document.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram depicting an example of a configuration of a search system according to an embodiment of the present invention;

FIG. 2 is a table depicting an example of a document list file according to the present embodiment;

FIG. 3 is a table depicting an example of a creation date list file according to the present embodiment;

FIG. 4 is a table depicting an example of a link relationship file according to the present embodiment;

FIG. 5 is a table depicting an example of an evaluation list file according to the present embodiment;

FIG. 6 is a table depicting an example of a reference frequency list file according to the present embodiment;

FIG. 7 is a flowchart depicting an example of operation of an importance calculation section according to the present embodiment;

FIG. 8 is a table depicting an example of an importance list file according to the present embodiment;

FIG. 11 is a table depicting an example of a matrix D determined by matrix determination processing according to the present embodiment;

FIG. 12 is a table depicting an example of results obtained by the iterative calculation processing according to the present embodiment;

FIG. 13 is a table depicting an example of tallied data according to the present embodiment;

FIG. 15 is a table depicting an example of link relationship data according to the present embodiment;

FIG. 16 is a table depicting weight data determined by matrix determination processing in a first example of the present embodiment;

FIG. 17 is a table depicting a matrix D determined by the matrix determination processing in the first example of the present embodiment;

FIG. 18 is a table depicting a result obtained by the iterative calculation processing in the first example of the present embodiment;

FIG. 19 is a table depicting the weight data determined by the matrix determination processing in the second example of the present embodiment;

FIG. 20 is a table depicting a matrix D determined by the matrix determination processing in the second example of the present embodiment;

FIG. 21 is a table depicting a result obtained by the iterative calculation processing in the second example of the present embodiment;

FIG. 22 is a table depicting the weight data determined by the matrix determination processing in the third example of the present embodiment;

FIG. 23 is a table depicting the matrix D determined by the matrix determination processing in the third example of the present embodiment;

FIG. 24 is a table depicting a result obtained by the iterative calculation processing in the third example of the present embodiment;

FIG. 25 is a table depicting values of Rand( ) determined by the matrix determination processing in a fourth example of the present embodiment;

FIG. 26 is a table depicting the matrix D determined by the matrix determination processing in the fourth example of the present embodiment;

FIG. 27 is a table depicting a result obtained by the iterative calculation processing in the fourth example of the present embodiment;

FIG. 28 is a table depicting the matrix D determined by the matrix determination processing in a fifth example of the present embodiment; and FIG. 29 is a table depicting a result obtained by the iterative calculation processing in the fifth example of the present embodiment.

DESCRIPTION OF EMBODIMENT

Figure 9:
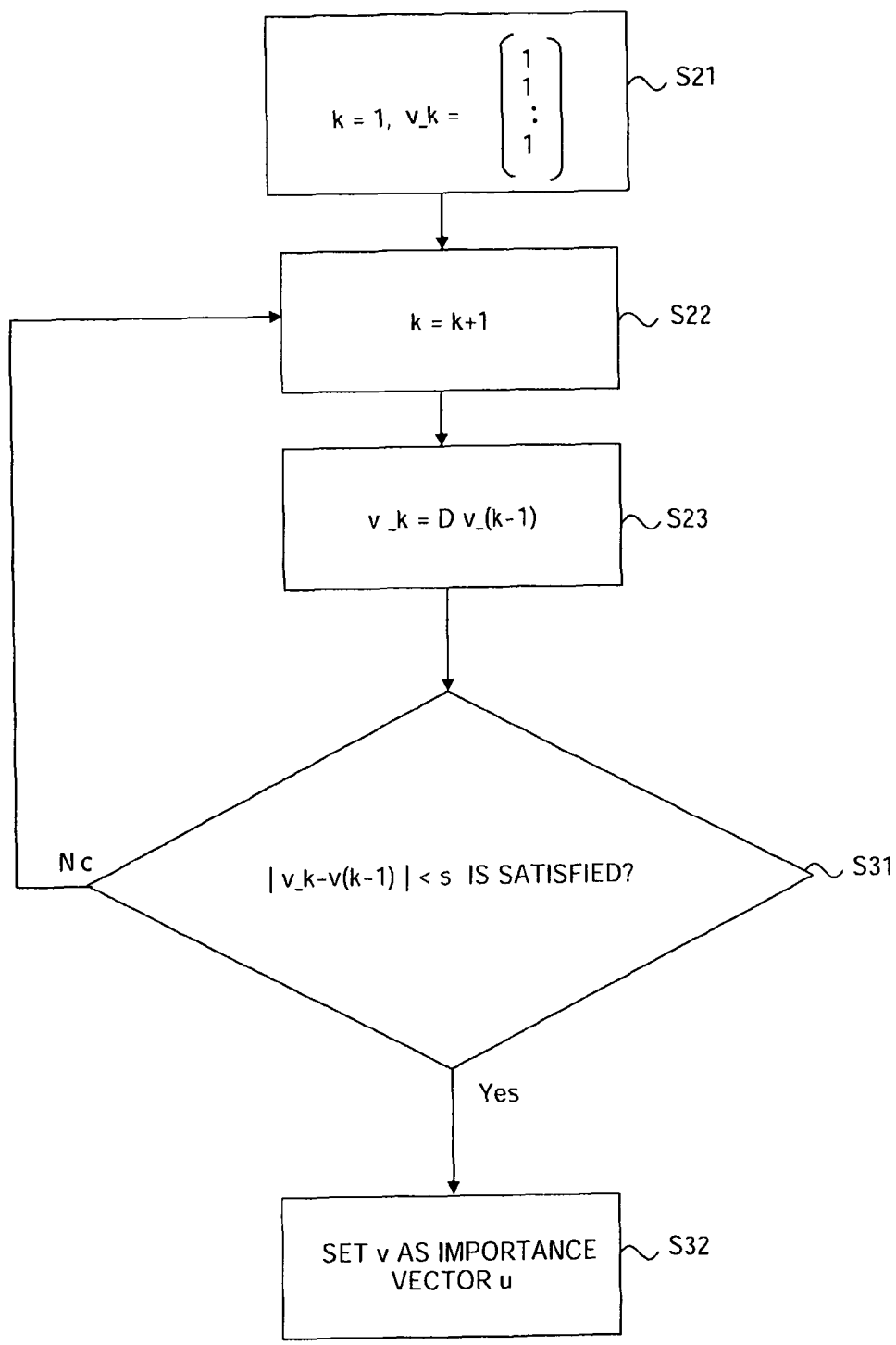
FIG. 9 is a flowchart depicting a comparative example of iterative calculation processing according to the Prior Art.

An embodiment of the present invention will be described below with reference to the accompanying drawings.

In the present embodiment, a search system to which a document importance calculation apparatus according to the present invention is applied will be described.

First, a configuration of the search system according to the present embodiment will be described.

FIG. 1 is a block diagram depicting an example of a configuration of the search system according to the present embodiment. This search system includes a terminal 1, a search server 2, a document management section 3, a search index management section 4, and an importance calculation section 5. The terminal 1, search server 2, document management section 3, search index management section 4, and importance calculation section 5 are each realized by a computer and are connected via a network. Each of the computers has a CPU and a memory. The CPU executes a process allowed by a program on the memory.

The Document management section 3 stores and manages search target documents which are documents to be searched for by the search server 2. The search index management section 4 registers a search index for the search target documents and reflects an importance list file concerning the search target documents which is transmitted from the importance calculation section 5 in the search index. The terminal 1 transmits a search instruction and a document reference instruction to the search server 2 in accordance with an operation by a user referring to the documents. Further, the terminal 1 transmits an evaluation for each search target document which is given by the user to the search server 2.

The search server 2 uses the search index of the search index management section 4 to search the search target documents according to the search instruction from the terminal 1 and transmits a result of the search to the terminal 1. Further, according to the document reference instruction from the terminal 1, the search server 2 acquires a specified document from the document management section 3 so as to transmit it to the terminal 1 and transmits a document reference history as reference history information to the importance calculation section 5. The search server 2 transmits the evaluation for the search target document which is transmitted from the terminal 1 to the importance calculation section 5.

The importance calculation section 5 is accomplished by a computer which has a storage device. The importance calculation section 5 includes a document list creation section 12, a creation date extraction section 13, a link analysis section 14, an evaluation reception section 15, a reference frequency calculation section 16, a matrix determination section 17, and an iterative calculation section 18. A parameter acquisition section corresponds to the document list creation section 12, creation date extraction section 13, link analysis section 14, evaluation reception section 15, and reference frequency calculation section 16 in the present embodiment. The importance calculation section 5 includes an acquiring section.

The document list creation section 12 receives from the document management section 3 information of the search target documents managed by the document management section 3 and creates a document list file which is a list of the search target documents managed by the document management section 3 based on the information of the search target documents. FIG. 2 is a table depicting an example of the document list file according to the present embodiment. The creation date extraction section 13 receives from the document management section 3 information of the search target documents managed by the document management section 3 and creates a creation date list file which is a list of the creation dates of the search target documents managed by the document management section 3 based on the information of the search target documents. FIG. 3 is a table depicting an example of the creation date list file according to the present embodiment. The link analysis section 14 receives from the document management section 3 information of the search target documents managed by the document management section 3 and analyzes the link embedded in each search target document managed by the document management section 3 and creates a result of the analysis as a link relationship file. FIG. 4 is a table depicting an example of the link relationship file according to the present embodiment. The evaluation reception section 15 receives the user's evaluation for the search target document which is transmitted from the search server 2 and creates an evaluation list file based on the evaluation. FIG. 5 is a table depicting an example of the evaluation list file according to the present embodiment. The reference frequency calculation section 16 receives reference history information from the search server 2 and calculates the frequency (number of times) of reference to each search target document based on reference history information and creates a reference frequency list file. FIG. 6 is a table depicting an example of the reference frequency list file according to the present embodiment. The document list creation section 12 stores the document list file in the storage device. The creation date extraction section 13 stores the creation date list file in the storage device. The link analysis section 14 stores the a result of the analysis in the storage device. The evaluation reception section 15 stores the evaluation list file in the storage device. The reference frequency calculation section 16 stores the reference frequency list file in the storage device.

Next, operation of the importance calculation section 5 will be described.

FIG. 7 is a flowchart depicting an example of the operation of the importance calculation section 5 according to the present embodiment. The document list creation section 12, the creation date extraction section 13, the link analysis section 14, the evaluation reception section 15, and the reference frequency calculation section 16 perform parameter acquisition processing of acquiring parameters concerning each document and creating the document list file, creation date list file, link relationship file, evaluation list file, and reference frequency list (S11: parameter acquisition step). Then, the matrix determination section 17 performs matrix determination processing of determining a matrix D for calculation of the importance of each search target document based on the above respective files and stores D in a memory in the importance calculation section 5 (S12: matrix determination step). Subsequently, the iterative calculation section 18 performs iterative calculation processing of calculating the importance of each search target document by using the matrix D and stores in a storage device in the importance calculation section 5 a result of the calculation as an importance list file and transmits the importance list file to the search index management section 4 (S13: iterative calculation step), and this flow is ended. FIG. 8 is a table depicting an example of the importance list file according to the present embodiment.

Next, the operation of the iterative calculation processing will be described.

It is assumed that the total number of the search target documents is N, N being a positive integer, and that IDs from 1 to N are assigned to the search target documents by the document management section 3. Further, a search target document of ID n is assumed to be $P\_n$. Further, when a positive real number is $u\_n$ ($n=1, 2, \ldots, N$), a column vector having, as an element, $u\_n$ is assumed to be u. $d\_i\_j$ ($i, j=1, 2, \ldots, N$) is assumed to be an arbitrary positive real number, and a matrix in which $(i,j)$th element is $d\_i\_j$ is assumed to be D.

According to the Perron-Frobenius theorem of linear algebra, an arbitrary D has positive eigenvalues (corresponding to numeral e in which a vector u that satisfies $e\,u=D\,u$ and that is not 0 exists, and this u is called an eigenvector of D with respect to e). The maximum one among the positive eigenvalues is a Frobenius root of D. The eigenvectors u of D with respect to the Frobenius root e are positive and, thus, only one eigenvector u satisfies $|u|=1$. The norm used here is assumed to the infinite norm ($|u|=\max\{|u\_n|; n=1, 2, \ldots, N\}$).

A designer of the search system can freely define D in accordance with various parameters given to the search target document $P\_n$ ($n=1, 2, \ldots, N$) (e.g., link relationship, creation date, evaluation given by user referring to document, number of times of reference to document). Since there exists, for thus defined D, only one set of the Frobenius root e of D and positive eigenvector u with respect to e that satisfies $|u|=1$, $u\_n$ obtained at this time is defined as the importance of $P\_n$.

When $d\_m\_n$ is defined as the following equations assuming that $L\_n$ links are available from $P\_n$, u that satisfies $u=D\,u$, $|u|=1$ can calculate the same value as that in the technique disclosed in Patent Document 1. The norm used here is assumed to be one norm ($|u|=u\_1+u\_2+\ldots+u\_N$), and the number of links available from $P\_n$ is assumed to be $L\_n$. The constant c is assumed to be 0.15.

$$d\_m\_n = c/N$$

(in the case where there is no link from $P\_n$ to $P\_m$)

$$d\_m\_n = c/N + (1-c)/L\_n$$

(in the case where there is any link from $P\_n$ to $P\_m$)

Next, a comparative example of iterative calculation processing using the technique disclosed in Patent Document 1 and the like and iterative calculation processing according to the present embodiment which is performed by the iterative calculation section 18 are compared.

First, the comparative example of iterative calculation processing will be described. FIG. 9 is a flowchart depicting a comparative example of an iterative calculation processing. The comparative example of iterative calculation processing sets the iteration count k to 1 and performs initialization with all elements of a column vector $v\_k$ having a length N set to 1 and stores $v\_k$ in a memory (S21). The comparative example of iterative calculation processing then increases k by 1 (S22). Subsequently, the comparative example of iterative calculation processing calculates $v\_k = D\,v\_(k-1)$ and updates $v\_k$ in the memory (S23).

The comparative example of iterative calculation processing then calculates the norm $|v\_k - v\_(k-1)|$ of a difference between $v\_k$ obtained at this time and $v\_(k-1)$ obtained at the previous time and determines whether $|v\_k - v\_(k-1)| < s$ is satisfied or not (S31). The threshold s is a quite small positive integer and is 0.00001, for example. In the case where $|v\_k - v\_(k-1)| < s$ is not satisfied (No in S31), the flow returns to S22, and S22 and subsequent steps are repeated. In the case where $|v\_k - v\_(k-1)| < s$ is satisfied (Yes in S31), the comparative example of iterative calculation processing sets $v\_k$ as importance vector u (S32), and this flow is ended.

However, the elements of each column of D used in the comparative example of iterative calculation processing is probability based on the link relationship, and there is a restriction that the sum of the elements of each column of D must be 1. If this restriction is not satisfied, $v\_k$ diverges, making it impossible to calculate the importance.

Figure 10:
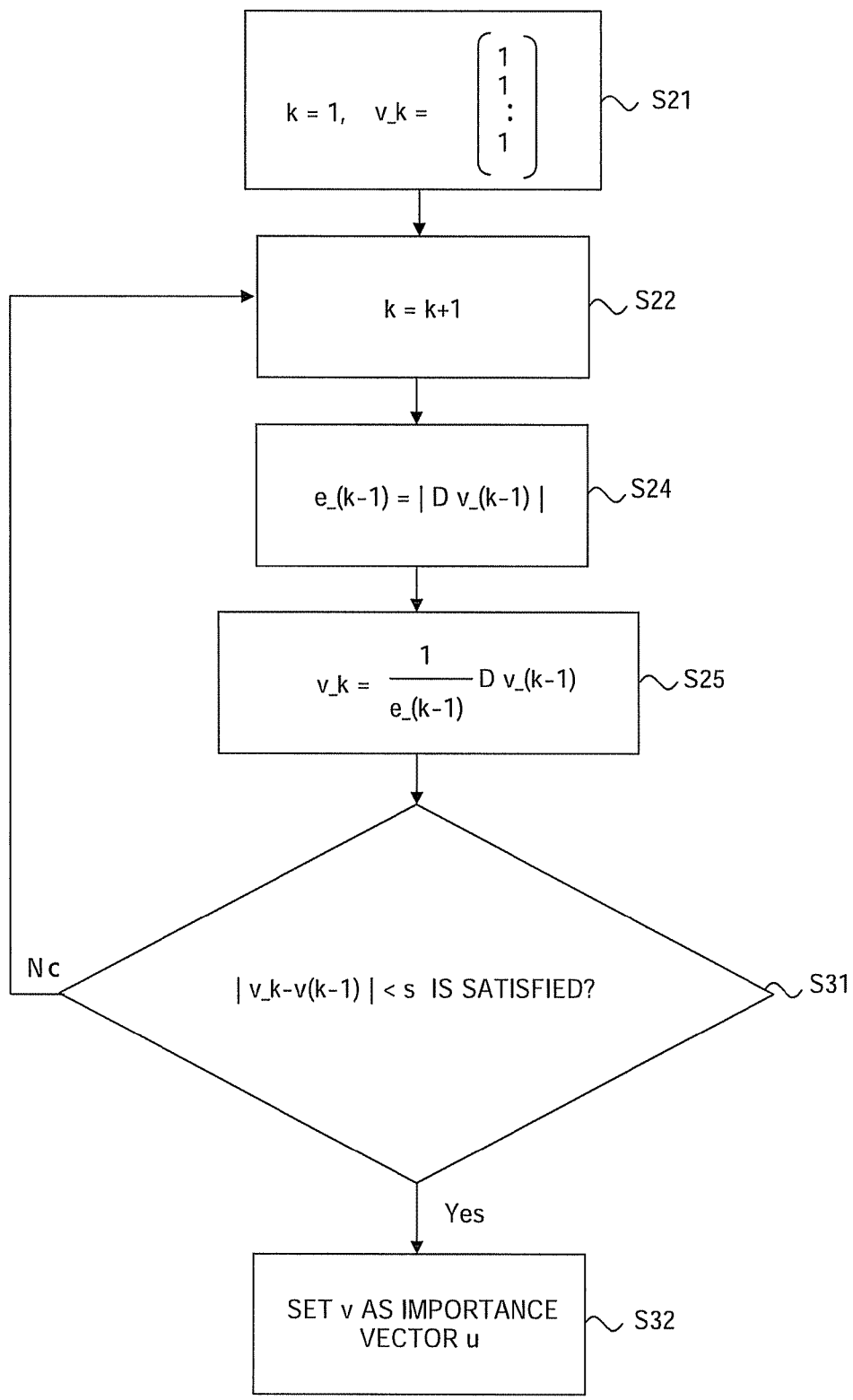
FIG. 10 is a flowchart depicting an example of iterative calculation processing according to the present embodiment.

Next, iterative calculation processing according to the present embodiment will be described. FIG. 10 is a flowchart depicting an example of the iterative calculation processing according to the present embodiment. In FIG. 10, the same reference numerals as those in FIG. 9 denote the same processing as in FIG. 9, and the descriptions thereof will be omitted here. As can be seen by comparing with the comparative example of iterative calculation processing, the iterative calculation processing according to the present embodiment executes S24 and S25 in place of S23.

First, as in the case of the comparative example of iterative calculation processing, the iterative calculation section 18 executes S21 and S22. Then, the iterative calculation section 18 calculates $e\_(k-1) = |D\,v\_(k-1)|$ (S24) and $v\_k = (1/e\_(k-1))D\,v\_(k-1)$ and updates $v\_k$ in the memory (S25). $w = D\,v\_(k-1)/|D\,v\_(k-1)|$ is equivalent to $v\_k$.

The iterative calculation section 18 then executes S31 as in the case of the comparative example of iterative calculation processing. In the case where $|v\_k - v\_(k-1)| < s$ is not satisfied (No in S31), the flow returns to S22 and the iterative calculation section 18 repeats S22 and subsequent steps. In the case where $|v\_k - v\_(k-1)| < s$ is satisfied (Yes in S31), the iterative calculation section 18 executes S32 as in the case of the comparative example of iterative calculation processing, and this flow is ended.

According to the iterative calculation processing of the present embodiment, as k is increased, $e\_k$ converges to e, and $v\_k$ converges to u. Further, the iterative calculation is ended, by S31, at the time point when a change in $v\_k$ becomes satisfactorily small. That is, the iterative calculation section 18 calculates $v\_k$ which is an approximation of u that satisfies $e\,u = D\,u$.

With the processing of S24 and S25, the iterative calculation processing according to the present embodiment can converge v_k without giving the restriction of the comparative example to D.

A concrete example of the iterative calculation processing according to the present embodiment will be described.

FIG. 11 is a table depicting an example of a matrix D determined by the matrix determination processing according to the present embodiment. In this example, D is determined as depicting in this table with N set to 6. It is only necessary for this D, to which the restriction as that applied to D of the comparative example is not applied, that each element is a positive real number. FIG. 12 is a table depicting an example of results obtained by the iterative calculation processing according to the present embodiment. This table depicts iteration count k set by S22 and values of D v_(k−1) and e_(k−1) calculated by S24, v_k calculated by S25, v_k−v_(k−1), v_(k−1)−v_k, and |v_k−v_(k−1)| calculated by S31. These values (calculation results) are represented for each iterative count k. In this example, |v_k−v_(k−1)| falls below a threshold value at the time point of iterative count k=10, so that the iterative calculation section 18 ends the iterative calculation and sets v_10 as the importance vector u with respect to D.

Next, an outline of the matrix determination processing will be described.

In the present embodiment, matrix D can freely be defined by the iterative calculation processing, so that a designer of the search system can reflect creation date of the search target document or evaluation given by the user in D. Hereinafter, the outline of the matrix determination processing will be described using an example in which D is determined based on creation dates of the search target documents, evaluation therefor, frequency of reference thereto, and link relationship thereamong.

It is assumed that the creation date of P_m is p days before the time of the matrix determination processing. The matrix determination section 17 calculates p based on the current date and creation date list file. It is assumed that weighting when the creation date of the search target document is p days before the calculation time is x_m (positive real number). x_m is set so as to become larger as p becomes smaller.

Further, it is assumed that the evaluation for the search target document P_m is y_m (positive real number). The matrix determination section 17 calculates y_m based on the evaluation list file. y_m is set so as to become larger as the evaluation becomes higher.

Further, it is assumed that the frequency of reference to the search target document P_m is z_m (positive real number). The matrix determination section 17 calculates z_m based on the reference frequency list file. z_m is set so as to become larger as the reference frequency becomes larger.

Then, the matrix determination section 17 determines presence/absence of the link from P_n to P_m based on the link relationship file and determines the element d_m_n of D depending on the presence/absence of the link. Here, a case where the product of x_m, y_m, and z_m is used for the calculation of d_m_n is represented. d_m_n is defined by the following equations.

$$d\_m\_n = c x\_m y\_m z\_m$$

$$(m, n = 1, 2, \ldots, N)$$

(in the case where there is no link from P_n to P_m)

$$d\_m\_n = c x\_m y\_m z\_m + x\_m x\_n y\_m y\_n z\_m z\_n$$

$$(m, n = 1, 2, \ldots, N)$$

(in the case where there is any link from P_n to P_m)

Although the influence that x_m, y_m, and z_m exert on d_m_n is represented by the product of x_m, y_m, z_m, x_n, y_n, and z_n in this example, it may be represented by the sum or other operations thereof.

As described above, a designer of the search system can freely determine D considering the influence of a plurality of parameters (in this embodiment, creation date, evaluation, reference frequency, and link relationship).

Next, a concrete example of data used in the matrix determination processing will be described.

The matrix determination section 17 tallies up data and utilizes the resultant data as tallied data. FIG. 13 is a table depicting an example of the tallied data according to the present embodiment. It is assumed, in this example, that the number N of search target documents is 6 and that the data tallying date is 2007/2/7. The matrix determination section 17 acquires creation date from the creation date list file, calculates difference p between the data tallying date (present) and creation date, selects from the evaluation list file effective evaluations satisfying a predetermined criterion so as to count the number q of the effective evaluations, and acquires reference frequency r from the reference frequency list file. The table of FIG. 13 depicts the tallied results of creation date, difference p of date, the number q of effective evaluations, and reference frequency r for each P_n (n=1, 2, . . . , 6).

Figure 14:
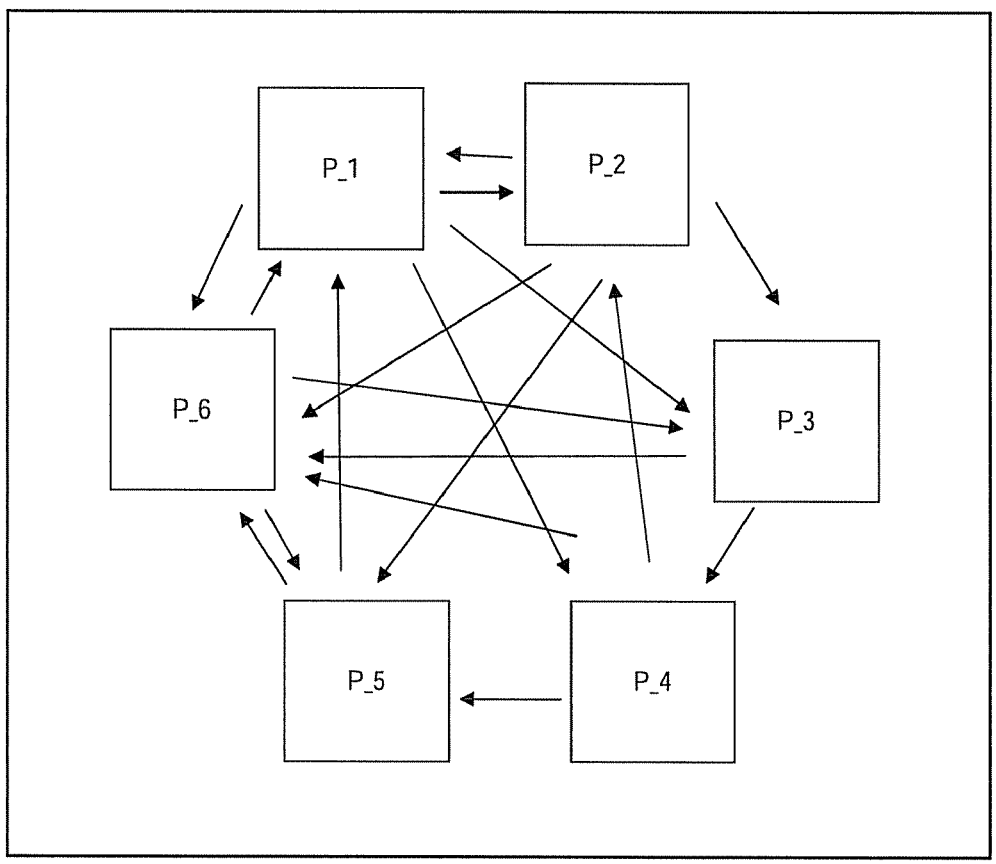
FIG. 14 is a table depicting an example of link relationship according to the present embodiment.

FIG. 14 is a table depicting an example of the link relationship according to the present embodiment. It is assumed that there exists a link relationship as depicted in FIG. 14 among P_n (n=1, 2, . . . , 6). The matrix determination section 17 tallies up links based on the link relationship file depicting the link relationship and utilizes the resultant data as link relationship data. FIG. 15 is a table depicting an example of the link relationship data according to the present embodiment. In the table of FIG. 15, documents represented below a column title "from" are link sources, and documents represented to the right of a row title "to" are link destinations. "o" denotes existence of a link between a link source and link destination corresponding to the cell in which "o" is placed. Further, the number L_n of links available from P_n is tallied up for each link source.

Next, examples of operation of the importance calculation section 5 will be described. In the following examples, values of the abovementioned tallied data and link relation data are used.

As a first example of the operation of the importance calculation section 5, a case where importance emphasizing the creation date is calculated will be described.

In the matrix determination processing, the matrix determination section 17 uses the tallied data to calculate, as weight data of a search target document P_m for each parameter, weight data x_m representing the weight of the creation date, weight data y_m representing the weight of the number of effective evaluations, and weight data z_m representing the weight of the reference frequency. x_m, y_m, and z_m are defined by the following equations respectively.

$$x\_m = \exp(-p/100) * 1.5$$

$$y\_m = \log(q+2) * 0.2$$

$$z\_m = \log(r+2) * 0.03$$

According to the above equations, x_m is set higher. FIG. 16 is a table depicting the weight data determined by the matrix determination processing in the first example of the present embodiment. The matrix determination section 17 then determines presence/absence of the link from P_n to P_m based on the link relationship data and determines the element d_m_n of D depending on the presence/absence of the link and weight data. Here, a case where the sum of x_m, y_m, and z_m is used for the calculation of d_m_n will be described. d_m_n is defined by the following equations.

$$d\_m\_n = c/N + x\_m + y\_m + z\_m \ (m, n = 1, 2, \ldots, N)$$

(in the case where there is no link from P_n to P_m)

$$d\_m\_n = c/N + x\_m + y\_m + z\_m + (1-c)*(x\_m + y\_m + z\_m)/L\_n$$

$$(m, n = 1, 2, \ldots, N)$$

(in the case where there is any link from P_n to P_m)

$$c = 0.15$$

Then, the matrix determination section 17 determines D by applying the above equations to the abovementioned values of the link relationship data and weight data. FIG. 17 is a table depicting the matrix D determined by the matrix determination processing in the first example of the present embodiment. In the table of FIG. 17, a number assigned to each row denotes m, a number assigned to each column denotes n, and an element specified by m and n denotes the value of d_m_n.

Then, the iterative calculation section 18 executes the flow of the abovementioned iterative calculation processing to calculate the importance vector u. FIG. 18 is a table depicting a result obtained by the iterative calculation processing in the first example of the present embodiment. Since |v_k−v_(k−1)| falls below the threshold value at the time when k=10, the iterative calculation section 18 ends the iterative calculation and sets v_10 as the importance vector u with respect to D. The iterative calculation section 18 may set the ranking among importance u_m (m=1, 2, . . . , 6) which are elements of the obtained u in terms of magnitude as the display order among P_m (m=1, 2, . . . , 6). It can be seen that the display orders of P_1 and P_2 in which the value of period p from the creation date to data tallying date is relatively small become higher by the above weighting. According to the first example, it is possible to obtain the importance and display order emphasizing the influence of the creation date while considering the influences of the respective parameters such as the creation date, number of effective evaluations, reference frequency, and link relationship.

Next, as a second example of the operation of the importance calculation section 5, a case where importance emphasizing the number of effective evaluations is calculated will be described.

In the matrix determination processing, the weight data x_m, y_m, and z_m are defined by the following equations respectively.

$$x\_m = \exp(-p/100)*0.2$$

$$y\_m = \log(q+2)*1.2$$

$$z\_m = \log(r+2)*0.03$$

It can be seen that equations of the first and second examples differ in the magnitude of the factor at the end of the equation. That is, in the second example, y_m is set higher. FIG. 19 is a table depicting the weight data determined by the matrix determination processing in the second example of the present embodiment. The matrix determination section 17 uses the weight data to determine D in the same manner as in the first example. FIG. 20 is a table depicting the matrix D determined by the matrix determination processing in the second example of the present embodiment.

Then, the iterative calculation section 18 executes the flow of the abovementioned iterative calculation processing to calculate the importance vector u. FIG. 21 is a table depicting a result obtained by the iterative calculation processing in the second example of the present embodiment. Since |v_k−v_(k−1)| falls below the threshold value at the time when k=10, the iterative calculation section 18 ends the iterative calculation and sets v_10 as the importance vector u with respect to D. It can be seen that the display orders of P_4 and P_6 in which the value of the number p of effective evaluations is relatively large become higher by the above weighting. According to the second example, it is possible to obtain the importance and display order emphasizing the influence of the number of effective evaluations while considering the influences of the respective parameters such as the creation date, number of effective evaluations, reference frequency, and link relationship.

Next, as a third example of the operation of the importance calculation section 5, a case where importance emphasizing the reference frequency is calculated will be described.

In the matrix determination processing, the weight data x_m, y_m, and z_m are defined by the following equations respectively.

$$x\_m = \exp(-p/100)*0.2$$

$$y\_m = \log(q+2)*0.2$$

$$z\_m = \log(r+2)*0.2$$

It can be seen that equations of the first and third examples differ in the magnitude of the factor at the end of the equation. That is, in the third example, z_m is set higher. FIG. 22 is a table depicting the weight data determined by the matrix determination processing in the third example of the present embodiment. The matrix determination section 17 uses the weight data to determine D in the same manner as in the first example. FIG. 23 is a table depicting the matrix D determined by the matrix determination processing in the third example of the present embodiment.

Then, the iterative calculation processing section 18 executes the flow of the abovementioned iterative calculation processing to calculate the importance vector u. FIG. 24 is a table depicting a result obtained by the iterative calculation processing in the third example of the present embodiment. Since |v_k−v_(k−1)| falls below the threshold value at the time when k=11, the iterative calculation section 18 ends the iterative calculation and sets v_11 as the importance vector u with respect to D. It can be seen that the display orders of P_4 and P_3 in which the value of the reference frequency r is relatively large become higher by the above weighting. According to the third example, it is possible to obtain the importance and display order emphasizing the influence of the reference frequency while considering the influences of the respective parameters such as the creation date, number of effective evaluations, reference frequency, and link relationship.

Next, as a fourth example of the operation of the importance calculation section 5, a case where the importance is calculated with the weight data is randomly set will be described.

The matrix determination section 17 sets the weight data of d_m_n as random numbers. The matrix determination section 17 then determines presence/absence of the link from P_n to P_m based on the link relationship file and determines the element d_m_n of D depending on the presence/absence of the link and weight data. d_m_n is defined by the following equations.

$$d\_m\_n = c/N + Rand(\ )$$

$$(m, n = 1, 2, \ldots, N)$$

(in the case where there is no link from P_n to P_m)

$$d\_m\_n = c/N + (1-c)/L\_n + Rand()$$

$$(m, n = 1, 2, \ldots, N)$$

(in the case where there is any link from P_n to P_m)

$$c = 0.15$$

Rand( ) is a function that generates a random real number not less than 0 and less than 1. FIG. 25 is a table depicting values of Rand( ) determined by the matrix determination processing in the fourth example of the present embodiment. FIG. 26 is a table depicting the matrix D determined by the matrix determination processing in the fourth example of the present embodiment.

Then, the iterative calculation section 18 executes the flow of the abovementioned iterative calculation processing to calculate the importance vector u. FIG. 27 is a table depicting a result obtained by the iterative calculation processing in the fourth example of the present embodiment. Since $|v\_k-v\_(k-1)|$ falls below the threshold value at the time when k=8, the iterative calculation section 18 ends the iterative calculation and sets v_8 as the importance vector u with respect to D. According to the fourth example, it is possible to obtain the importance and display order on which the influence of random numbers is exerted while considering the influences of the link relationship.

Next, as a fifth example of the operation of the importance calculation section 5, a case where the importance is calculated based only on the link relationship, without using the weight data will be described.

The matrix determination section 17 then determines presence/absence of the link from P_n to P_m based on the link relationship file and determines the element d_m_n of D depending on the presence/absence of the link. d_m_n is defined by the following equations.

$$d\_m\_n = c/N$$

$$(m, n = 1, 2, \ldots, N)$$

(in the case where there is no link from P_n to P_m)

$$d\_m\_n = c/N + (1-c)/L\_n$$

$$(m, n = 1, 2, \ldots, N)$$

(in the case where there is any link from P_n to P_m)

$$c = 0.15$$

FIG. 28 is a table depicting the matrix D determined by the matrix determination processing in the fifth example of the present embodiment. This D is a matrix reflected only in the link relationship.

Then, the iterative calculation section 18 executes the flow of the abovementioned iterative calculation processing to calculate the importance vector u. FIG. 29 is a table depicting a result obtained by the iterative calculation processing in the fifth example of the present embodiment. Since $|v\_k-v\_(k-1)|$ falls below the threshold value at the time when k=14, the iterative calculation section 18 ends the iterative calculation and sets v_14 as the importance vector u with respect to D. According to the fifth example in which the weight data is not used, it is possible to obtain the importance and display order based only on the link relationship as in the case of the technique disclosed in Patent Document 1.

According to the present embodiment, a designer of the search system can define the weighting of a plurality of parameters with less restrictions than ever before by using the above iterative calculation algorithm so as to determine the matrix D. Further, it is possible to calculate the importance by a single matrix calculation regardless of the number of the parameters, making it possible to calculate the importance at high speed without losing information of all the parameters used.

The document importance calculation apparatus according to the present embodiment can easily be applied to an information processing apparatus to thereby enhance performance thereof. Examples of the information processing apparatus include, e.g., a server, a PC (Personal Computer), and the like.

Further, it is possible to provide a program that allows a computer constituting the document importance calculation apparatus to execute the above steps as a document importance calculation program. By storing the above program in a computer-readable storage medium, it is possible to allow the computer constituting the document importance calculation apparatus to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; another computer and database thereof.

According to the present embodiment, it is possible to effectively calculate the importance of a document considering the influence of parameters concerning the document.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer readable storage medium storing a document importance calculation program that allows a computer to execute a process comprising:

acquiring information related to N documents;

determining elements of an N×N square matrix D based on the acquired information, in order that D, a positive real number e, and a column vector u having N elements satisfy e u=D u according to the Perron-Frobenius theorem, each of the elements of D being a positive real number, each of the elements of u corresponding to an importance of each of the N documents;

initializing a column vector v having N elements so as to store v in a memory, each of the elements of v corresponding to each of the elements of u;

calculating a column vector w=(D v)/|D v|;

updating v in the memory to w;

iterating the calculating of w and the updating of v, until the updated v satisfies a predetermined condition, so as to obtain the updated v being an approximation of u; and assigning each of elements of the updated v to the importance of a corresponding document.

2. The non-transitory computer readable storage medium according to claim 1, wherein the information includes any of a link relationship among the N documents, a creation date of each of the N documents, an evaluation result for each of the N documents by a referrer, and a frequency of references to each of the N documents.

3. The non-transitory computer readable storage medium according to claim 1, wherein the determining calculates a value of an element of D in the m-th row and n-th column, according to the information related to an m-th document in the N documents or the information related to the m-th and n-th documents in the N documents.

4. The non-transitory computer readable storage medium according to claim 1, wherein the predetermined condition is that a norm of a difference between v before the updating and v after the updating is smaller than a predetermined threshold value.

5. The non-transitory computer readable storage medium according to claim 1, wherein the acquiring receives the information from a storage via a network.

6. The non-transitory computer readable storage medium according to claim 1, wherein the information includes a creation date of an m-th document of the N documents, and the determining determines a value of an element of D in the m-th row and n-th column according to a predetermined relationship that the determined value increases with increasing the creation date of the m-th document.

7. The non-transitory computer readable storage medium according to claim 1, wherein the information includes evaluation results for an m-th document of the N documents, the determining selects from the evaluation results specific evaluation results satisfying a predetermined criterion, counts the number of the specific evaluation results, and determines a value of an element of D in the m-th row and n-th column in D according to a predetermined relationship that the determined value increases with increasing the counted number.

8. The non-transitory computer readable storage medium according to claim 1, wherein the information includes a frequency of references to an m-th document of the N documents, and the determining determines a value of an element of D in the m-th row and n-th column according to a predetermined relationship that the determined value increases with increasing the frequency.

9. The non-transitory computer readable storage medium according to claim 1, wherein the information includes a link relationship of an m-th document to another document, and when the link relationship indicates a link from an n-th document to the m-th document, the determining increases a value of an element of D in the m-th row and n-th column.

10. A document importance calculation apparatus comprising:

a processor coupled to a memory, wherein the processor is programmed to execute a process comprising:

acquiring information related to N documents;

determining elements of an N×N square matrix D based on the acquired information, in order that D, a positive real number e, and a column vector u having N elements satisfy e u=D u according to the Perron-Frobenius theorem, each of the elements of D being a positive real number, each of the elements of u corresponding to an importance of each of the N documents;

initializing a column vector v having N elements so as to store v in the memory, each of the elements of v corresponding to each of the elements of u, calculating a column vector w=(D v)/|D v|, updating v in the memory to w, iterating the calculating of w and the updating of v, until the updated v satisfies a predetermined condition, so as to obtain the updated v being an approximation of u, and assigning each of elements of the updated v to the importance of a corresponding document.

11. The document importance calculation apparatus according to claim 10, wherein the information includes any of a link relationship among the N documents, a creation date of each of the N documents, an evaluation result for each of the N documents by a referrer, and a frequency of references to each of the N documents.

12. The document importance calculation apparatus according to claim 10, wherein a matrix determination section calculates a value of an element of D in the m-th row and n-th column, according to the information related to an m-th document in the N documents or the information related to the m-th and n-th documents in the N documents.

13. The document importance calculation apparatus according to claim 10, wherein the predetermined condition is that a norm of a difference between v before the updating and v after the updating is smaller than a predetermined threshold value.

14. The document importance calculation apparatus according to claim 10, wherein an acquiring section receives the information from a storage via a network.

15. The document importance calculation apparatus according to claim 10, wherein the information includes a creation date of an m-th document of the N documents, and a matrix determination section determines a value of an element of D in the m-th row and n-th column according to a predetermined relationship that the determined value increases with increasing the creation date of the m-th document.

16. The document importance calculation apparatus according to claim 10, wherein the information includes evaluation results for an m-th document of the N documents, a matrix determination section selects from the evaluation results specific evaluation results satisfying a predetermined criterion, counts the number of the specific evaluation results, and determines a value of an element of D in the m-th row and n-th column in D according to a predetermined relationship that the determined value increases with increasing the counted number.

17. The document importance calculation apparatus according to claim 10, wherein
the information includes frequency of references to an m-th document of the N documents, and
a matrix determination section determines a value of an element of D in the m-th row and n-th column according to a predetermined relationship that the determined value increases with increasing the frequency.

18. The document importance calculation apparatus according to claim 10, wherein
the information includes a link relationship of an m-th document to another document, and
when the link relationship indicates a link from an n-th document to the m-th document, the matrix determination section increases a value of an element of D in the m-th row and n-th column.

19. A document importance calculation method comprising:
acquiring information related to N documents;
determining elements of an N×n square matrix D based on the acquired information, in order that D, a positive real number e, and a column vector u having N elements satisfy e u=D u according to the Perron-Frobenius theorem, each of the elements of D being a positive real number, each of the elements of u corresponding to an importance of each of the N documents;
initializing a column vector v having N elements so as to store v in a memory, each of the elements of v corresponding to each of the elements of u;
calculating a column vector w=(D v)/|D v|;
updating v in the memory to w;
iterating the calculating of w and the updating of v, until the updated v satisfies a predetermined condition, so as to obtain the updated v being an approximation of u; and
assigning each of elements of the updated v to the importance of a corresponding document.

20. The document importance calculation method according to claim 19, wherein
the information includes any of a link relationship among the N documents, a creation date of each of the N documents, an evaluation result for each of the N documents by a referrer, and a frequency of references to each of the N documents.

* * * * *